(12) United States Patent
Briscoe

(10) Patent No.: US 12,722,991 B2
(45) **Date of Patent: *Sep. 1, 2026**

(54) WATER SANITIZATION DEVICE, SYSTEM AND METHOD

(71) Applicant: WATERCO LIMITED, Rydalmere (AU)

(72) Inventor: Nicholas James Briscoe, Rydalmere (AU)

(73) Assignee: Waterco Limited, Rydalmere (AU)

( * ) Notice: Subject to any disclaimer, the term of this patent is extended or adjusted under 35 U.S.C. 154(b) by 810 days.

This patent is subject to a terminal disclaimer.

(21) Appl. No.: 17/997,234

(22) PCT Filed: May 21, 2021

(86) PCT No.: PCT/AU2021/050482

§ 371 (c)(1),
(2) Date: Oct. 26, 2022

(87) PCT Pub. No.: WO2021/232111

PCT Pub. Date: Nov. 25, 2021

(65) Prior Publication Data

US 2023/0183107 A1 Jun. 15, 2023

(30) Foreign Application Priority Data

May 22, 2020 (AU) ................................ 2020901663

(51) Int. Cl.
*C02F 1/467* (2023.01)
*C02F 103/42* (2006.01)
(Continued)

(52) U.S. Cl.
CPC ........ *C02F 1/4674* (2013.01); *C02F 2103/42* (2013.01); *C02F 2201/4612* (2013.01);
(Continued)

(58) Field of Classification Search
CPC ............ C02F 1/4674; C02F 2201/4612; C02F 2209/005; C02F 1/467; C02F 1/4672; C02F 1/4676; C02F 2103/42; C25B 1/26
See application file for complete search history.

(56) References Cited

U.S. PATENT DOCUMENTS 4,324,635 A 4/1982 Sweeney
5,084,149 A 1/1992 Kaczur et al.
(Continued)

FOREIGN PATENT DOCUMENTS

CN 109055966 A 12/2018
DE 10017407 A1 * 10/2001 ............ C02F 1/4674
(Continued)

OTHER PUBLICATIONS

Notion of Allowance for U.S. Appl. No. 17/906,834 mailed on May 28, 2025, 8 pages.
(Continued)

*Primary Examiner* — Luan V Van
*Assistant Examiner* — Alexander R. Parent
(74) *Attorney, Agent, or Firm* — Perkins Coie LLP; Viola Kung; Danica Harbaugh

(57) ABSTRACT

A method of sanitising a body of water including the steps of adding sodium chlorite and/or sodium chlorate to the body of water and converting the sodium chlorite and/or sodium chlorate to chlorine dioxide in an electrolysis cell which is in fluid communication with a water circulation system of the body of water, wherein chlorine is also added to the body of water.

7 Claims, 1 Drawing Sheet

(51) Int. Cl.
*C25B 1/26* (2006.01)
*C25B 15/029* (2021.01)

(52) U.S. Cl.
CPC .......................... *C02F 2201/4618* (2013.01); *C02F 2209/005* (2013.01); *C02F 2209/29* (2013.01); *C02F 2209/40* (2013.01); *C02F 2209/44* (2013.01); *C02F 2303/04* (2013.01); *C25B 1/26* (2013.01); *C25B 15/029* (2021.01)

(56) References Cited

U.S. PATENT DOCUMENTS

| | | | | |
|---|---|---|---|---|
| 5,242,554 | A | 9/1993 | Kaczur et al. | |
| 5,478,446 | A | 12/1995 | Falgen et al. | |
| 5,752,282 | A * | 5/1998 | Silveri | C02F 1/4674 4/541.3 |
| 5,965,004 | A | 10/1999 | Cowley et al. | |
| 6,254,762 | B1 | 7/2001 | Uno et al. | |
| 7,179,363 | B2 * | 2/2007 | DiMascio | C25B 1/26 205/556 |
| 7,883,622 | B1 * | 2/2011 | Barnes | C02F 1/78 210/206 |
| 8,784,733 | B2 | 7/2014 | Alarid et al. | |
| 2003/0006144 | A1 * | 1/2003 | Tremblay | C02F 1/46104 205/618 |
| 2004/0175322 | A1 | 9/2004 | Woodruff et al. | |
| 2004/0206707 | A1 | 10/2004 | Polak | |
| 2006/0131245 | A1 * | 6/2006 | Dennis, II | C02F 1/008 210/746 |
| 2008/0290044 | A1 * | 11/2008 | Nanjundiah | C02F 1/4674 210/764 |
| 2008/0308428 | A1 | 12/2008 | Chen et al. | |
| 2011/0024361 | A1 * | 2/2011 | Schwartzel | C02F 1/4674 204/290.01 |
| 2011/0062086 | A1 | 3/2011 | Burns et al. | |
| 2013/0071287 | A1 | 3/2013 | O'Connell | |
| 2014/0097095 | A1 * | 4/2014 | Moser | C25B 1/26 205/556 |
| 2021/0323838 | A1 * | 10/2021 | Martin | C02F 1/008 |

FOREIGN PATENT DOCUMENTS

| | | | | |
|---|---|---|---|---|
| GB | 2445940 | A * | 7/2008 | C25B 9/19 |
| JP | 2005254223 | A | 9/2005 | |
| KR | 100445756 | B1 | 8/2004 | |
| KR | 20070092931 | A | 9/2007 | |
| WO | 9511326 | A1 | 4/1995 | |
| WO | 03000595 | A2 | 1/2003 | |
| WO | 03016224 | A1 | 2/2003 | |
| WO | 2003025252 | A1 | 3/2003 | |
| WO | 2005117914 | A2 | 12/2005 | |
| WO | 2016076584 | A1 | 5/2016 | |

OTHER PUBLICATIONS

International Search Report mailed on Aug. 3, 2021 for PCT Application No. PCT/AU2021/050482, 5 pages.

* cited by examiner

WATER SANITIZATION DEVICE, SYSTEM AND METHOD

TECHNICAL FIELD

This application is a National Stage of International Application PCT/AU2021/050482, filed May 21, 2021, which claims the benefit of priority to Australian Patent Application 2020901663, filed May 22, 2020. The contents of the above-identified applications are incorporated herein by reference in their entireties.

The present disclosure relates to a device and method for swimming pool and spa water sanitisation. In particular, the present invention relates to the use of chlorine dioxide and chlorine for swimming pool and spa water sanitisation. However, it will be appreciated by those skilled in the art that the present invention may be utilised in other water treatment applications.

BACKGROUND OF THE INVENTION

With respect to swimming pool and spa water sanitisation, chlorine is typically used to sanitise the water. Chlorine acts as a disinfectant to kill bacteria, algae and other harmful organisms. However, although chlorine is suitable for sanitisation, it is desirable to avoid over chlorinating the water, as chlorine can have a strong taste and smell which may irritate some swimmers.

Chlorine is present in pool water in two forms:

1) Free chlorine—this is chlorine that has not reacted with any contaminants and is still available to disinfect pool water and oxidise organic substances; and
2) Combined chlorine (also known as chloramines)—this is "used" chlorine, that has reacted with organic substances and is no longer available to disinfect the water. Combined chlorine is the difference between free chlorine and total chlorine.

Chlorine is typically added to swimming pools and spas by two methods:

- manually adding the chlorine (usually in liquid, granular or tablet form), which is labour intensive and requires the pool water to be tested regularly, typically every two days to determine the required chlorine dose; or
- using a salt chlorinator to convert sodium chloride (i.e., salt) by electrolysis into chlorine gas which is soluble in water. Sodium chloride is generally added to the pool water at a dose of around 4 kg per 1,000 litres.

In addition to achieving the desired level of chlorination for sanitisation, it is also necessary to achieve a pH balance of acidity and alkalinity. For most swimming pool applications, it is desirable to achieve a pH level of between 7.2 and 7.6. If the pH level becomes too low, for example below 7, the water becomes acidic. This can result in eye and skin irritation and corrosion of metal pump and impellor components. In contrast, if the pH level becomes too high, for example over 8, chlorine activity becomes slowed and inefficient, resulting in sub-standard sanitisation. This may result also in eye and skin irritation.

There are many factors which need to be considered to correctly dose chlorine in a swimming pool. For example, the volume of water to be treated and the amount the pool is used (bathing load) are both relevant. In addition, sunlight and high ambient temperatures will result in increased dissipation of chlorine through evaporation, requiring increased chlorine dosing. As such, simply running a salt chlorinator continuously is not sufficient to provide the correct dose, as various site-specific factors need to be taken into consideration.

Another factor when correctly dosing chlorine in a swimming pool is the formation of chloramines (also known as combined chlorine). Chloramines are formed when free chlorine reacts with ammonia like compounds called amines.

$$\text{Free chlorine} + \text{ammonia compounds} = \text{chloramines}$$

Amines are introduced into the pool mainly by urine and perspiration. Chloramines are poor disinfectants and greatly reduce the disinfection power of free chlorine, irritate mucous membranes, cause eye stinging and red eyes, and irritate respiratory systems. The strong chlorine odour often smelled at poorly operated pools is caused by chloramines.

Operating guidelines of pools in Australia require that chloramine must not exceed 1 mg/L in any public swimming pool and spa pool, and pool operators should ensure as best practice that combined chlorine never exceeds half of the concentration of free chlorine.

Controlling chloramines is difficult and time-consuming. Current methods include:

- Continuous or daily breakpoint chlorination—a technique which burns out chloramines over-night so that breakpoint is reached by morning.
- Shock super-chlorination—a technique used to control a severe excess of chloramines. However, if it is not performed correctly it can result in even more problems for the pool operator. Super-chlorination must be carried out after the pool is closed to swimmers for that day. Maximum ventilation must be provided to remove all chloramines that form and volatilise into the air. Shock super-chlorination is practiced by adjusting the pH to 7.5 or lower and by the addition of sufficient chlorine to achieve a free chlorine concentration ten times the combined chlorine concentration. The pool circulation and filtration systems must be operated over-night.
- Shock dosing with oxygen shock products—hydrogen peroxide and potassium mono-persulphate are two common oxygen shock products that can be used to control chloramines in heavily used pools. These products lower the chlorine demand by oxidising pool contaminants thereby allowing free chlorine to better perform its disinfection role. Their use may lead to false high total chlorine measurement in the pool water for about one to two days after addition.
- Ultra violet light systems—recent evidence suggests that UV light systems, besides providing additional disinfection, also inactivates chlorine resistant micro-organisms such as the parasitic protozoans *Cryptosporidium parvum* and *Giardia lamblia*.
- Ozone—ozone may be used in addition to, but not instead of, chlorination. Pools utilising ozone must quench the ozone using a granular activated carbon filter before the water is returned to the pool. Provided the ozone is thoroughly mixed and dissolved, it reacts rapidly to destroy chloramines and disinfection by-products to reduce tastes, odours and eye stinging compounds.
- Dilution with fresh water—water can be used to dilute chloramines and will also reduce total dissolved solids (TDS). However, incoming mains supply water may contain monochloramine and should be tested to determine its concentration. The presence of high concentrations of monochloramine may not reduce chloramines in the pool.

Ventilation—ventilation is essential for efficient removal of chloramines and other air impurities. Chloramines when given off from a pool in the form of a gas will redissolve in the pool unless removed by an efficient ventilation system. A ventilation system needs to be well designed without causing drafts, to expel stale air, induce fresh air and lower humidity. The use of pool blankets at night prevent chloramines from escaping and they may reform in the pool.

Chlorine dioxide is a chemical compound with the formula $ClO_2$. As one of several oxides of chlorine, chlorine dioxide is a potent and useful oxidizing agent which can be used in water treatment and in bleaching.

Chlorine dioxide does not form bi-products that cause obnoxious odours (unlike chlorine) and has several applications within the water treatment industry, where it has been previously used in the treatment of wastewater effluent.

However, there are several factors that have limited the commercial viability of chlorine dioxide as a disinfectant for swimming pools and spas. These limitations include (but are not limited to) the following:

- cost of production can be high;
- chlorine dioxide is inconvenient to mix;
- some convenient forms of chlorine dioxide production (such as dissolvable tablets) are expensive and do not have full activation;
- in situ systems are expensive to operate and maintain and they can also be dangerous;
- in situ mixing of chlorine dioxide in liquid form poses OH&S issues. The mixture has a short shelf life once mixed on site;
- chlorine dioxide be explosive if not mixed correctly;
- chlorine dioxide is highly corrosive and therefore difficult to maintain dosing equipment;
- chlorine dioxide easily gasses off in water when agitated; and
- chlorine dioxide breaks down when subjected to U/V.

Chlorine dioxide is formed generally when sodium chlorite and/or sodium chlorate is activated by secondary chemicals to reduce a chemical reaction to form chlorine dioxide. The most common reactions used in industry is activating sodium chlorite/chlorate with hydrochloric acid to form chlorine dioxide. This reaction can be very dangerous if not controlled correctly. It is the dangers that surround the activation of sodium chlorite/chlorate that have made chlorine dioxide a difficult agent to use in water treatment.

There are different types of equipment available to automate the process of producing chlorine dioxide. The equipment is generally very expensive and requires regular maintenance. There are several reasons why the equipment is expensive, such as:

- high concentrations of chlorine dioxide are very corrosive—materials used in the equipment must be able to withstand the corrosion which in turn makes the equipment expensive;
- the reaction between the hydrochloric acid and sodium chlorite/chlorate can become explosive if the incorrect concentrations are mixed—extensive checks and measures must be implemented in a device that produces high concentrations of chlorine dioxide to prevent an explosion or release of high concentrations of chlorine dioxide gas from the device;
- the life span of the equipment is generally short due to the highly corrosive environment that high concentrations of chlorine dioxide create; and
- the equipment requires a highly skilled technician to service and operate the device to produce high concentration chlorine dioxide.

There are other methods used to make chlorine dioxide for use in water treatment that do not use automated equipment. One such method is to mix sodium chlorite/chlorate with a separate powdered activator. The powdered activator may include such chemicals as sodium bisulphate, di-chlorine and sodium percarbonate. A mixture of sodium chlorite/chlorate and the activator is prepared at the point of use in a batching container. The batch must be made with the exact chemical concentrations to avoid safety risks such as explosion and excessive gas release. Once the batch is made it has a very short life as chlorine dioxide deteriorates quickly once it is exposed to the atmosphere.

This method of preparation is very dangerous and potentially could pose difficulty in preparation due to OH&S requirements. Facilities find it difficult to secure insurance for premises that undertake this method of preparation for the use of chlorine dioxide.

Another method for using chlorine dioxide is in tablet form. A combination of sodium chlorite/chlorate crystals and sodium bisulphate are combined in a pressed tablet. When the tablet comes in contact with water a chemical reaction occurs, and chlorine dioxide is formed. Whilst this is a very convenient way to administer chlorine dioxide to a body of water the cost of the tablets is generally prohibitive as a long-term form of water treatment.

Other challenges with the formation of chlorine dioxide surround the activation process. Generally, only 60-75% of the sodium chlorite/chlorate is activated in the chemical reaction process. This can lead to a build-up of unused sodium chlorite/chlorate in water over time if used in a closed loop application. Also, the waste of unactuated sodium chlorite/chlorate adds to the cost of production of chlorine dioxide.

Any discussion of the prior art throughout the specification should in no way be considered as an admission that such prior art is widely known or forms part of common general knowledge in the field.

OBJECT OF THE INVENTION

It is an object of the present invention to substantially overcome or at least ameliorate one or more of the above disadvantages, or to provide a useful alternative.

SUMMARY OF THE INVENTION

The present invention is based on the surprising finding that chlorine dioxide produced by electrolysis of sodium chlorite/chlorate is an effective disinfectant and reduces levels of combined chlorine.

In a first aspect, the present invention provides a method of sanitising a body of water including the steps of:

- adding sodium chlorite and/or sodium chlorate to the body of water;
- converting the sodium chlorite and/or sodium chlorate to chlorine dioxide in an electrolysis cell which is in fluid communication with a water circulation system of the body of water; and
- adding chlorine to the body of water.

The chlorine is preferably added to the body of water by:

adding sodium chloride to the body of water; and converting the sodium chloride to chlorine in the electrolysis cell.

In another aspect, the present invention provides a method of sanitising a body of water including the steps of:

adding sodium chlorite and/or sodium chlorate to the body of water;

converting the sodium chlorite and/or sodium chlorate to chlorine dioxide in an electrolysis cell which is in fluid communication with a water circulation system of the body of water;

adding sodium chloride to the body of water; and converting the sodium chloride to chlorine in the electrolysis cell.

Sodium chlorite and/or sodium chlorate is preferably added to the body of water to produce a target chlorine dioxide concentration of 0.1 to 1.5 ppm.

Sodium chlorite and/or sodium chlorate is preferably added to the body of water to produce a target chlorine dioxide concentration of 0.1 to 1 ppm.

Sodium chlorite and/or sodium chlorate is preferably added to the body of water to produce a target chlorine dioxide concentration of 0.2 to 1 ppm.

Sodium chlorite and/or sodium chlorate is preferably added to the body of water to produce a target chlorine dioxide concentration of 0.2 to 0.5 ppm.

Sodium chlorite and/or sodium chlorate is preferably added to the body of water to produce a target chlorine dioxide concentration of about 0.1 ppm, about 0.2 ppm, about 0.3 ppm, about 0.4 ppm, about 0.5 ppm, about 0.6 ppm, about 0.7 ppm, about 0.8 ppm, about 0.9 ppm, about 1 ppm, about 1.1 ppm, about 1.2 ppm, about 1.3 ppm, about 1.4 ppm, about 1.5 ppm.

1 to 10 grams of sodium chlorite and/or 0.5 to 5 grams of sodium chlorate are preferably added per thousand litres of the body of water.

About 3 grams of sodium chlorite and/or about 1.5 grams of sodium chlorate are preferably added per thousand litres of the body of water.

Chlorine is preferably added to the body of water to produce a target free chlorine concentration of 1 to 10 ppm.

Chlorine is preferably added to the body of water to produce a target free chlorine concentration of 1 to 6 ppm.

Chlorine is preferably added to the body of water to produce a target free chlorine concentration of 1 to 3 ppm.

Chlorine is preferably added to the body of water to produce a target free chlorine concentration of about 1 ppm, about 1 ppm, about 2 ppm, about 3 ppm, about 4 ppm, about 5 ppm, about 6 ppm, about 7 ppm, about 8 ppm, about 9 ppm, about 10 ppm.

Sodium chloride is preferably added to the body of water to produce a target free chlorine concentration of 1 to 10 ppm.

Sodium chloride is preferably added to the body of water to produce a target free chlorine concentration of 1 to 6 ppm.

Sodium chloride is preferably added to the body of water to produce a target free chlorine concentration of 1 to 3 ppm.

Sodium chloride is preferably added to the body of water to produce a target free chlorine concentration of about 1 ppm, about 1 ppm, about 2 ppm, about 3 ppm, about 4 ppm, about 5 ppm, about 6 ppm, about 7 ppm, about 8 ppm, about 9 ppm, about 10 ppm.

In a second aspect, the present invention provides a water sanitisation system comprising:

an electrolysis cell configured to be installed in a water circulation system of a body of water, the electrolysis cell operable to convert sodium chlorite and/or sodium chlorate to chlorine dioxide, and sodium chloride to chlorine;

a control unit in communication with the electrolysis cell; and a sensor configured to detect a level of chlorine dioxide present in the body of water, wherein the control unit is configured to stop or slow the electrolysis cell when the sensor determines that a level of chlorine dioxide present in the body of water has exceeded a predetermined threshold.

The water sanitisation system further preferably comprises a dosing device configured to deliver sodium chlorite and/or sodium chlorate to the body of water.

The dosing device preferably delivers sodium chlorite and/or sodium chlorate to the body of water at predetermined time intervals.

The dosing device preferably delivers sodium chlorite and/or sodium chlorate to the body of water responsive to the level of chlorine dioxide identified by the sensor.

The control unit is preferably configured to stop or slow the electrolysis cell when the sensor determines that the level of chlorine dioxide is 0.8 ppm or above.

The electrolysis cell is preferably controlled by the control unit in the following way:

high chlorine dioxide production if sensed chlorine dioxide level is less than 1.5 ppm;

low chlorine dioxide production if sensed chlorine dioxide level is between 0.1 and 1.5 ppm; and no chlorine dioxide production if sensed chlorine dioxide level is above 1.5 ppm.

The body of water is preferably a swimming pool or spa.

The body of water is preferably a swimming pool.

The body of water is preferably a spa.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

BRIEF DESCRIPTION OF THE DRAWINGS

A preferred embodiment of the invention will now be described by way of specific example with reference to the accompanying drawing, in which.

DETAILED DESCRIPTION OF THE PREFERRED EMBODIMENTS

Figure 1:
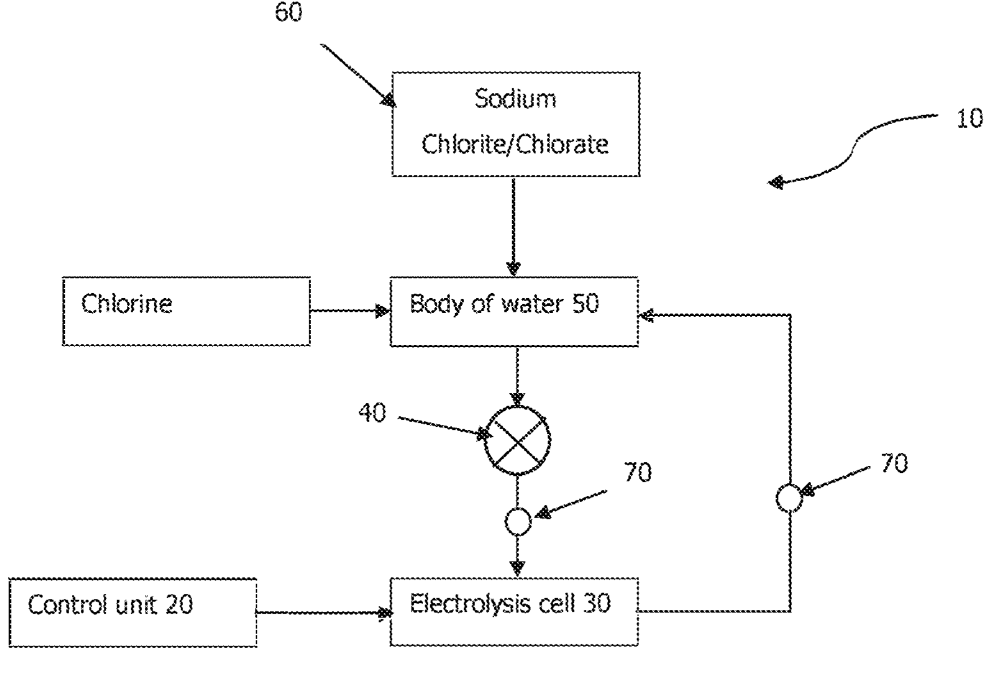
FIG. 1 is a diagram of an embodiment of a method of sanitising water according to the invention.
Figure 2:
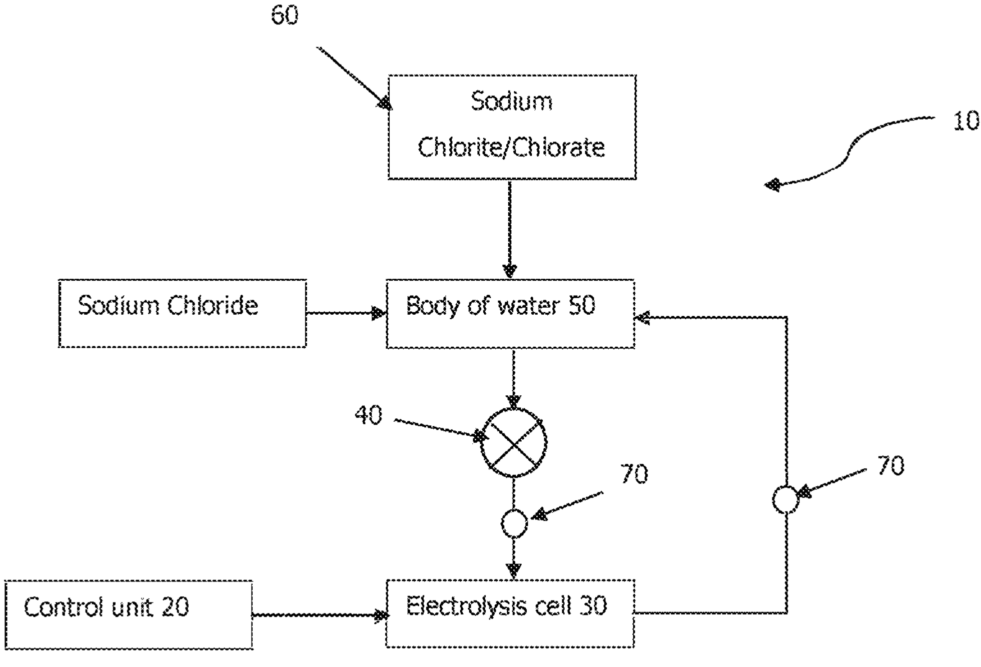
FIG. 2 is a diagram of a further embodiment of a method of sanitising water according to the invention.

Electrolysis is used to generate chlorine in some water treatment applications. The most common of which is found in swimming pools. Commonly known as a saltwater chlorinator, the device requires a TDS (Total Dissolved Solids) level of 4500-6000 ppm to generate sufficient chlorine to sanitise a swimming pool. Advancements in this field have resulted in reduced TDS levels within the body of water whilst maintaining adequate production of chlorine to maintain the swimming pool. Salt chlorinators that operate at TDS levels between 600-1000 ppm are now much more common in the marketplace.

The process by which chlorine is generated via this device involves an electrochemical reaction that generates (in part) hypochlorous acid.

As noted in the background, there are several disadvantages associated with using chlorine dioxide to sanitise water. In order to address these problems, the applicant has identified a new approach to form chlorine dioxide in water. Instead of using a traditional method of mixing sodium chlorite/chlorate with an activator (usually hydrochloric acid) to prepare a substance ready formed to dose into the water, the applicant has separated out the main ingredient to the formation of chlorine dioxide (sodium chlorite ($NaClO_2$) and/or sodium chlorate ($NaClO_3$)) and added it directly into the water. An electrolysis process is then used to convert the sodium chlorite and/or sodium chlorate into chlorine dioxide whilst water is flowing through the electrochemical cell.

Some advantages of this process are as follows:

all of the sodium chlorite and/or sodium chlorate added to the main body of the water will eventually be converted into chlorine dioxide;

as the chemical process occurs in a flow through cell, the generation of chlorine dioxide is highly diluted and poses no safety issues;

as the chlorine dioxide is highly diluted at the point of manufacture, the likelihood of damage from corrosion is eliminated, or at least significantly reduced;

the convenience of generating chlorine dioxide from only adding sodium chlorite and/or sodium chlorate to the water reduces safety risk of having to pre-mix chemicals to form chlorine dioxide;

the generation of chlorine from the process continues as normal even though chlorine dioxide is being produced simultaneously;

cost of production is dramatically reduced as activation of chlorine dioxide can be completed by the same equipment that would normally produce chlorine;

the equipment used to generate chlorine dioxide in this way is inexpensive and will not be prone to breakdowns; and the shelf life of sodium chlorite/chlorate is extremely long so this could be stored on site without fear of it deteriorating.

The applicant has discovered a water treatment system based on the addition of a sodium chlorite and/or sodium chlorate to the main body of the water and then passing the water through an electrolysis cell 30, resulting in the formation of chlorine dioxide.

The body of water 50 is in fluid communication with the electrolysis cell 30 with a pump 40. The system 10 operates as a closed loop, such that the water pumped from the body of water 50 is returned to the body of water 50 after passing through the electrolysis cell 30.

A control unit 20 controls the rate of electrolysis in the electrolysis cell 30.

According to the World Health Organisation, the maximum recommended level of sodium chlorite concentration in drinking water is not recommended to be higher than 1 ppm. It may be practicable to increase the sodium chlorite level in the main body of water beyond 1 ppm if the water was not strictly intended for the sole purpose of consumption by humans, for example, for swimming pool applications.

The generation of chlorine dioxide using this method is mostly suitable for closed loop situations. This would include any form of storage of water that requires treatment to remove pathogens and for the control of biofilm. This includes, but is not limited to swimming pools, spas, fish tanks, reservoirs, ponds, aquaculture facilities and other water storage and holding facilities.

The levels of chlorine dioxide produced using this method have been detected at between 0.5 ppm to 1.0 ppm after 72 hours of recirculation on a body of water 50,000 litres (indoor conditions) whilst the saltwater chlorinator continues to produce sufficient chlorine to register an adequate residual in the water. There are numerous variations to the size of the electrolysis apparatus, sodium chlorite levels and TDS that could improve the output of chlorine dioxide and make it viable for a number of different applications for a large number of different industries that rely on good quality water free of biofilms and pathogens.

The advantages in using this approach to the formation of chlorine dioxide are significant. They include the following:

chlorine dioxide is formed in the recirculation line without any exposure to the outer atmosphere. This results in no chance of a release of gas at dangerous levels that may pose any health risk;

the chlorine dioxide that is formed in the cell is immediately mixed into the water flowing through the device resulting in immediate dilution of the chlorine dioxide. This prevents deterioration of the equipment as it will not be exposed to high concentrations of chlorine dioxide;

adding a specifically formulated stabilised sodium chlorite into a body of water does not pose any OH&S risks for the operator;

no particular specific skill is required to operate the device to produce chlorine dioxide;

there is absolutely no risk of the equipment causing an explosive situation as the chlorine dioxide produced is immediately diluted with the water passing through the device;

the cost of the apparatus is very low and does not require constant maintenance to operate;

whilst there is a level of sodium chlorite in the water and a minimum TDS, constant chlorine dioxide will be generated through the apparatus;

the activation rate of sodium chlorite is 100%—only 75% activation can be achieved using other methods;

chlorine and chlorine dioxide are formed simultaneously thus providing a sequential disinfection system not previously possible from one device;

transport of stabilised sodium chlorite can be achieved within existing chemical transport regulations at low cost;

the cost to produce chlorine dioxide in this way is the most inexpensive way possible; and the convenience to the operator is not matched with any other current know method to produce chlorine dioxide.

The control unit 20 monitors and regulates chlorine dioxide production by the electrolytic cell 30. The control unit 20 is connected to a 240-volt AC mains power supply.

The electrolysis cell 30 consists of a series of titanium electrodes with opposing charges. The electrodes are housed in an electrode cage.

In operation, the control unit 20 provides electricity to the electrolysis cell 30 (anode and cathode) and holds an electrical potential difference between them for a designated period of time. The polarity may be subsequently reversed after that period of time has expired and then the anode becomes the cathode and the cathode becomes the anode.

The reversing of polarity or electrical potential difference acts to remove any calcium build-up, which may have been deposited onto the cathode. Accordingly, this continuous reversing of polarity provides a self-cleaning functionality which keeps the electrolysis cell 30 clean from calcium deposits during its operation, providing the chemical balance and flow of the pool/spa water through the electrolysis cell 30 is maintained within normal parameters.

The control unit 20 may stop or slow the rate of electrolysis when a target amount of chlorine dioxide and/or chlorine is achieved in the body of water.

The control unit 20 may include a chlorine dioxide sensor 70, or alternatively may be connected to a chlorine dioxide sensor 70 which is configured to detect the level of chlorine dioxide present in the body of water 50, or in the return line extending between the electrolysis cell 30 and the body of water 50. Preferably the chlorine dioxide sensor is located in the line between the pump 40 and the electrolysis cell 30.

The control unit 20 is configured to stop or slow the electrolysis cell 30 when the sensor 70 determines that a level of chlorine dioxide and/or chlorine which is present in the body of water has exceeded a predetermined threshold. The target level of chlorine dioxide is 0.1 ppm to 1.5 ppm, and the target level of free chlorine is 1 ppm to 10 ppm.

The control unit 20 may also provide a warning, such as an alarm if the level of chlorine dioxide sensed by the sensor 70 is below 0.1 ppm or exceeds 1.5 ppm or some other predetermined threshold. Alternatively, the control unit 20 may switch off the electrolysis cell 30 if the level of chlorine dioxide sensed by the sensor 70 exceeds 1.5 ppm.

For example, the electrolysis cell 30 may be operated at three settings:

high chlorine dioxide production if sensed chlorine dioxide level is less than 0.1 ppm;

low chlorine dioxide production if sensed chlorine dioxide level is between 0.1 and 1.5 ppm; and no chlorine dioxide production if sensed chlorine dioxide level is above 1.5 ppm.

The system 10 may include an automatic dosing device 60 for dosing and delivering the sodium chlorite/chlorate into the body of water 50. The dosing device 60 may deliver the required rate of sodium chlorite/chlorate to the body of water 50, or the return line, based on a predetermined schedule, for example every day, every three days, or every week. Alternatively, the dosing device 60 may deliver the sodium chlorite/chlorate into the body of water 50 based on feedback regarding the level of chlorine dioxide detected by the sensor 70.

Although the invention has been described with reference to specific examples, it will be appreciated by those skilled in the art that the invention may be embodied in many other forms.

EXAMPLES

A field trial was conducted in a 950,000-litre pool to assess the efficacy of chlorine dioxide produced from sodium chlorite/chlorite by an Ecoline® electrolysis system (see Table 1) in combination with chlorine.

TABLE 1

| Date | Free Cl (ppm) | Total Cl (ppm) | Combined Cl (ppm) | pH | $ClO_2$ (ppm) | |
|---|---|---|---|---|---|---|
| 17 Feb. 2021 | 6.2 | 7.6 | 1.4 | 7.85 | 0 | |
| 18 Feb. 2021 | 6.2 | 6.6 | 0.4 | 7.55 | 0 | ← |
| 19 Feb. 2021 | 6.4 | 6.5 | 0.1 | 7.6 | | |
| 20 Feb. 2021 | 8.1 | 9 | 0.9 | 7.75 | | |
| 21 Feb. 2021 | 8.4 | 8.6 | 0.2 | 7.75 | | |
| 22 Feb. 2021 | 8.9 | 9.8 | 0.9 | 7.9 | | |
| 23 Feb. 2021 | 5.4 | 5.5 | 0.1 | 7.7 | 1 | |
| 24 Feb. 2021 | 5 | 5.5 | 0.5 | 7.5 | | |
| 25 Feb. 2021 | 6.4 | 6.4 | 0 | 7.6 | 0.7 | |
| 26 Feb. 2021 | 6.1 | 5.9 | 0.1 | 7.7 | | |
| 27 Feb. 2021 | 5.3 | 5.4 | 0.1 | 7.6 | | |
| 28 Feb. 2021 | 3.1 | 3.2 | 0.1 | 7.55 | | |
| 1 Mar. 2021 | 6.9 | 7.4 | 0.5 | 7.65 | | |
| 2 Mar. 2021 | 4.1 | 5 | 0.9 | 7.55 | 0.3 | ← |
| 3 Mar. 2021 | 4 | 4.3 | 0.3 | 7.55 | | |
| 4 Mar. 2021 | 4.6 | 4.6 | 0 | 7.55 | | |
| 5 Mar. 2021 | 5.5 | 5.8 | 0.3 | 7.75 | | |
| 6 Mar. 2021 | 4.9 | 5.1 | 0.2 | 7.55 | | |
| 7 Mar. 2021 | 5 | 5.3 | 0.3 | 7.85 | | |
| 8 Mar. 2021 | 4.8 | 5.1 | 0.3 | 7.8 | | ← |
| 9 Mar. 2021 | 6.1 | 6.1 | 0 | 7.8 | | |
| 10 Mar. 2021 | 4 | 4.1 | 0.1 | 7.55 | | |
| 11 Mar. 2021 | 5.4 | 5.4 | 0 | 7.8 | | |
| 12 Mar. 2021 | 5.1 | 5.3 | 0.2 | 7.8 | 1.2 | |
| 13 Mar. 2021 | 6.4 | 6.7 | 0.3 | 7.75 | | |
| 14 Mar. 2021 | 6.7 | 6.9 | 0.2 | 7.8 | | |

2 kg of sodium chlorite/chlorate was added on 18 Feb. 2021 and 500 g of sodium chlorite/chlorate was added on Feb. 3, 2021 and Aug. 3, 2021 (indicated by ←).

The output on the chlorinator was reduced by 15% on 22/02/2021 as the free chlorine levels increased as a result of having chlorine dioxide present in the water. The tests show a constant level of chlorine dioxide was produced during the trial. The test method used to determine the chlorine dioxide level in the pool was a test strip method.

The pool was experiencing a high combined chlorine level which was controlled once sodium chlorite/chlorate was added to the pool and converted to $ClO_2$ by electrolysis. Combined chlorine (also known as chlorates) are formed when free chlorine reacts with amines and chlorine dioxide has high reactivity towards tertiary amines, with electron transfer being the dominant pathway (Gan et al, *Environmental Science: Water Research & Technology,* 9: 2241-2630, September 2020).

The disinfection efficacy of chlorine and chlorine dioxide can be compared by analysing effective CT in water disinfection, which is determined by multiplying the concentration of the disinfectant (C, in mg/L) by the contact time (t, in minutes). A low CT value indicates a strong disinfectant. Table 2 presents the CT of free chlorine (1 mg/mL) and $ClO_2$ required to inactivate 99% of bacteria and 99.9% of other pathogens in water.

TABLE 2

| | Free chlorine pH 7.5 | | Free chlorine pH 8.5 | | Chloring dioxide pH 6-9 | |
|---|---|---|---|---|---|---|
| | 15° C. | 25° C. | 15° C. | 25° C. | 15° C. | 25° C. |
| E. coli | 0.046 | 0.049 | 0.171 | 0.182 | 0.104 | 0.046 |
| Viruses | 4.4 | 3.2 | 7.5 | 4.1 | 8.6 | 4.3 |
| *Giardia lamblia* cysts | 90 | 45 | 130 | 65 | 19 | 11 |
| *Cryptosporidium parvum* | >15,300 | 15,300 | | | 536 | 226 |

Table 2 shows that chlorine dioxide and free chlorine are both very effective in the inactivation of bacteria and viruses, with chlorine dioxide being more effective than free chlorine at inactivating protozoa (such as *Giardia* and *Cryptosporidium*).

The rate of consumption of chlorite/chlorite was calculated based on field trials. An electrolysis unit (rated to produce 30 grams of chlorine per hour at optimum TDS and operating 8 hours per day in a 50,000 litre pool) will consume 1 ppm of chlorite and 0.5 ppm of chlorate every 30 days.

The rate of chlorine dioxide production was calculated based on field trails. An electrolysis unit (rated to produce 30 grams of chlorine per hour at optimum TDS and operating 8 hours per day in a 50,000 litre pool) will produce a consistent level of 0.2-0.4 ppm chlorine dioxide from a solution containing a minimum level of 1 ppm chlorite and 0.5 ppm chlorate.

It is clear from the above that combining chlorine dioxide with chlorine has several benefits:

- adding chlorine dioxide reduces the formation of combined chlorine (i.e., chloramines which are poor disinfectants) and, therefore, increases the availability of free chlorine (which are good disinfectants);
- chlorine dioxide is an effective disinfectant against a range of pathogens, and is more effective against protozoa than chlorine; and
- adding chlorine dioxide allows a lower dosage of chlorine to be used.

The invention claimed is:

1. A water sanitisation system comprising:

an electrolysis cell arranged in a water circulation system of a body of water in a swimming pool or spa, the body of water containing (a) sodium chlorite and/or sodium chlorate and (b) sodium chloride, the electrolysis cell operable to convert sodium chlorite and/or sodium chlorate to chlorine dioxide, and sodium chloride to chlorine, a control unit in communication with the electrolysis cell; and a sensor configured to detect a level of chlorine dioxide and a level of free chlorine present in the body of water, wherein the control unit is configured to stop or slow the electrolysis cell when the sensor determines that the level of chlorine dioxide present in the body of water has exceeded a first predetermined threshold, wherein the first predetermined threshold is between 0.1 ppm and 1.5 ppm chlorine dioxide in a body of water, and wherein the control unit is configured to stop or slow the electrolysis cell when the sensor determines that the level of free chlorine present in the body of water has exceeded a second predetermined threshold, wherein the second predetermined threshold is between 1 ppm and 10 ppm free chlorine in a body of water, and wherein the electrolysis cell is controlled by the control unit to result in:

high chlorine dioxide production if the sensor determines that the level of chlorine dioxide is less than 0.1 ppm;

low chlorine dioxide production if the sensor determines that the level of chlorine dioxide is between 0.1 and 1.5 ppm; and no chlorine dioxide production if the sensor determines that the level of chlorine dioxide is above 1.5 ppm.

2. The water sanitisation system of claim 1, further comprising a dosing device configured to deliver sodium chlorite and/or sodium chlorate to the body of water.

3. The water sanitisation system of claim 2, wherein the dosing device delivers sodium chlorite and/or sodium chlorate to the body of water at predetermined time intervals.

4. The water sanitisation system of claim 2, wherein the dosing device delivers sodium chlorite and/or sodium chlorate to the body of water responsive to the level of chlorine dioxide identified by the sensor.

5. The water sanitisation system of claim 1, wherein the control unit is configured to provide a warning if the sensor determines the chlorine dioxide level is below 0.1 ppm.

6. The water sanitisation system of claim 1, wherein the control unit is configured to provide a warning if the sensor determines the chlorine dioxide level exceeds 1.5 ppm.

7. The water sanitisation system of claim 1, wherein the control unit is configured to switch off the electrolysis cell if the sensor determines the chlorine dioxide level exceeds 1.5 ppm.

* * * * *